May 6, 1930.  J. L. COLLINS  1,757,412
LEVER
Filed May 7, 1928
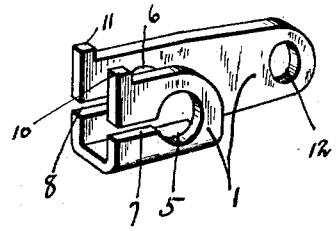
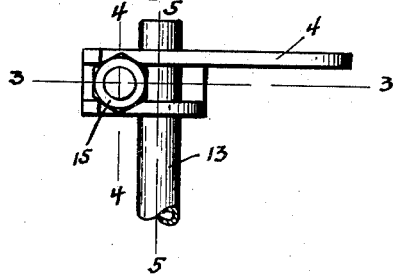
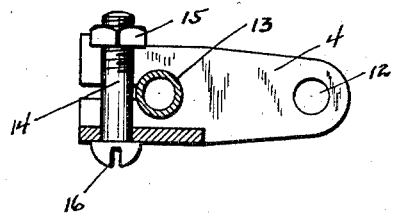
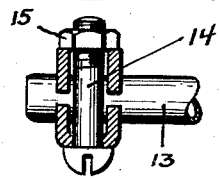
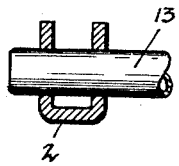
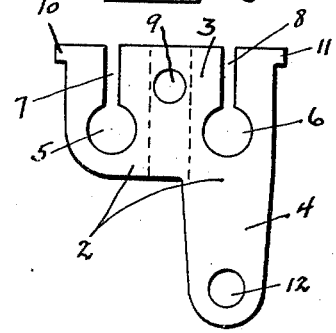
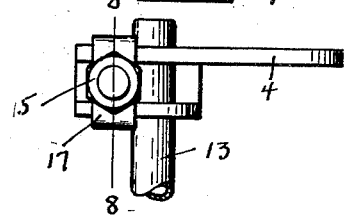
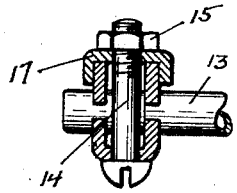
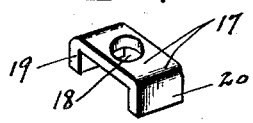
WITNESS
H. V. Hurst
INVENTOR
John L. Collins
BY Denison & Thompson
ATTORNEYS.

Patented May 6, 1930

1,757,412

UNITED STATES PATENT OFFICE

JOHN L. COLLINS, OF SYRACUSE, NEW YORK, ASSIGNOR TO THE WARNER CORPORATION, OF SYRACUSE, NEW YORK, A CORPORATION OF INDIANA

LEVER

Application filed May 7, 1928. Serial No. 275,858.

This invention relates to a new and improved lever and the method of manufacturing the same.

When levers are used in conjunction with control rods it is frequently desirable and often necessary that the lever be adjustable to different positions on the control rod. This is particularly necessary in the case of levers which are used with control rods to operate different parts of an automobile engine, as for example, the carburetor and the timer. It is also desirable in levers of this type that they be easily fixed on the control rod and easily adjusted thereon when necessary but at the same time they must be strong and a means must be provided so that when they are placed in position on a control rod they will be rigidly held in that position.

The main object of my invention is to produce a lever which can be easily and quickly assembled on and adjusted in relation to a control rod.

Another object is to produce a lever which is light in weight, which at the same time is very strong and which will remain rigidly in position when placed on a control rod in the desired position.

Another object is to design a lever which can be rapidly and cheaply constructed.

Other objects and advantages relate to the size, shape and relation of parts all as will more fully appear from the following description taken in connection with the accompanying drawings in which:—

Figure 1 is a perspective view of my lever in its finished shape.

Figure 2 is a top view of my lever in position on a control rod.

Figure 3 is a section on line 3—3 of Figure 2.

Figure 4 is a section on line 4—4 of Figure 2.

Figure 5 is a section on line 5—5 of Figure 2.

Figure 6 is an elevation of the metal blank from which my lever is made.

Figure 7 is a perspective view of a locking clip for use with my lever.

Figure 8 is a section on line 8—8 of Figure 9.

Figure 9 is a top view of my lever and locking clip in position on a control rod.

It is immaterial what material is used in the manufacture of my lever so long as the same is sufficiently strong in view of the particular use to which it is to be put, and it will be understood that the size of the different parts of my device and the apertures therethrough may be varied to accommodate themselves to different sizes and shapes of control rods.

For the purpose of explaining my invention and the method of manufacturing the different parts thereof I have here illustrated a lever —1— which has been formed from a metal blank —2— comprising a body —3— having an offset shank —4— extending downwardly from one edge thereof. Body —3— formed with two spaced apertures 5 and 6 adjacent the bottom edge thereof. A slot —7— extends upwardly from aperture —5— to the edge of body —3— and a similar slot —8— extends upwardly from aperture —6— to the edge of body —3—. Another aperture —9— is positioned adjacent the upper edge of body —3— equidistant from apertures —5— and —6—. At the end of the upper edge of body —3— I provide outwardly extending tabs —10— and —11—. Another aperture —12— is provided in the end of shank —4—.

As perhaps may best be seen from Figure 1 my lever is formed by folding the body —3— upon itself at the points indicated by dotted lines in Figure 6 so that the body —3— in the finished position is substantially U-shape with aperture —5— in registration with aperture —6— and with tabs —10— and —11— in parallel planes.

When it is desired to use my lever on a control rod the control rod 13 is inserted through apertures 5 and 6 and a bolt —14— is inserted through aperture —9—. A nut 15 is then placed on bolt —14— and positioned against tabs —10— and —11— so that nut —15— will be held against rotation. Bolt —14— may then be rotated by means of its slotted head —16—. Inasmuch as slot 7 extends from aperture —5— to the edge of the lever and slot 8 extends from aperture 6 to the edge of the lever it will be seen that when tension is placed on the opposite sides of my device by means of bolt —14— the opposite sides of the device will be sprung towards each other which will result in a clamping effect on control rod 13, and any necessary tension, to insure that the lever —1— remains rigidly in position on control rod 13 may be placed on the device.

It is sometimes desirable to provide a means to prevent any departure from their relative positions of tabs 10 and 11 when tension is placed on the device by the use of bolt 14 and in such cases I provide a locking clip 17 substantially U-shape in form and having a central aperture 18. As perhaps may best be seen from Figure 8 the distance between the depending sides 19 and 20 of locking clip 17 is such that when it is in position on lever —1— the sides of lever —1— adjacent tabs 10 and 11 will be positioned between sides 19 and 20. Aperture 18 is provided so that bolt 14 may extend upwardly therethrough and nut 15 be positioned on the upper surface of locking clip 17.

Aperture 12 is provided so that a link may be easily attached to the lever —1—.

It will be obvious that the position of the aperture 9 in relation to the apertures 5 and 6 may be varied as desired. It will also be obvious that my device may be made of a size and shape to coact with a variety of forms of control rods and it will also be obvious that my device may be used for many different purposes, for although I have shown and described a specific structure and form of part as an exemplification of an embodiment of my invention I do not desire to restrict myself to the exact shape, form and association of parts as various changes may be made within the scope of the appended claims.

What I claim is:

1. In a lever of sheet material, a U-shaped end, a shank formed by an extension of one of the sides of the U-shaped end, opposed apertures in the sides of the U-shaped end, a slot extending from each of the apertures, and an aperture in the bottom of the U-shaped end disposed on an axis in angular relation to the axis on which the apertures in the side of the U-shaped end are disposed.

2. In a lever of sheet material, a U-shaped end and a shank formed by an extension of one of the sides of the U-shaped end, a tab extending vertically from the edge of the top of each of the sides of the U-shaped end, opposed apertures in the sides of the U-shaped end, a slot extending from each of the apertures, and an aperture in the bottom of the U-shaped end disposed on an axis in angular relation to the axis on which the aperture in the sides of the U-shaped end are disposed.

3. In a lever of sheet material, a U-shaped end, a shank formed by an extension of one of the sides of the U-shaped end, opposed apertures in the sides of the U-shaped end, a slot extending from each aperture, an aperture in the bottom of the U-shaped end, and means for moving the sides of a slot towards each other.

4. In a lever of sheet material, a U-shaped end, a shank formed by an extension of one of the sides of the U-shaped end, opposed apertures in the sides of the U-shaped end, a slot extending from each aperture, an aperture in the bottom of the U-shaped end, means for moving the sides of a slot towards each other, and additional means for holding the sides of the slot in parallel spaced relation.

5. In a lever of sheet material, a U-shaped end having approximately parallel upright sides, a shank formed by an extension of one of the sides of the U-shaped end, opposed apertures in the sides of the U-shaped end, a slot extending from each aperture, an aperture in the bottom of the U-shaped end, a U-shaped clip positioned on the upper surfaces of the sides of the U-shaped end and having its depending sides in registration with the outer surfaces of the sides of the U-shaped end, an aperture in the bottom of the U-shaped clip, and a bolt extending through the aperture in the bottom of the U-shaped end and the aperture in the U-shaped clip.

In witness whereof I have hereunto set my hand this 30th day of April, 1928.

JOHN L. COLLINS.